United States Patent
Liu

(10) Patent No.: US 12,034,653 B2
(45) Date of Patent: Jul. 9, 2024

(54) PACKET PROCESSING METHOD AND RELATED DEVICES

(71) Applicant: ZTE CORPORATION, Guangdong (CN)

(72) Inventor: Feng Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 174 days.

(21) Appl. No.: 17/617,074

(22) PCT Filed: Jun. 5, 2020

(86) PCT No.: PCT/CN2020/094646
§ 371 (c)(1),
(2) Date: Dec. 7, 2021

(87) PCT Pub. No.: WO2021/004210
PCT Pub. Date: Jan. 14, 2021

(65) Prior Publication Data
US 2022/0231971 A1  Jul. 21, 2022

(30) Foreign Application Priority Data
Jul. 9, 2019 (CN) .......................... 201910615340.8

(51) Int. Cl.
| | | |
|---|---|---|
| H04L 49/9057 | (2022.01) | |
| H04L 1/00 | (2006.01) | |
| H04L 47/12 | (2022.01) | |
| H04L 47/2416 | (2022.01) | |
| H04L 47/28 | (2022.01) | |

(Continued)

(52) U.S. Cl.
CPC ........ *H04L 49/9057* (2013.01); *H04L 1/0006* (2013.01); *H04L 47/12* (2013.01); *H04L 47/2416* (2013.01); *H04L 47/28* (2013.01); *H04L 47/31* (2013.01); *H04L 47/34* (2013.01); *H04L 47/36* (2013.01); *H04L 2212/00* (2013.01)

(58) Field of Classification Search
CPC .... H04L 49/9057; H04L 1/0006; H04L 47/12
See application file for complete search history.

(56) References Cited

U.S. PATENT DOCUMENTS

| 9,413,633 B2 | 8/2016 | Meng |
| 2004/0184449 A1 | 9/2004 | Sreejith et al. |

(Continued)

FOREIGN PATENT DOCUMENTS

| CN | 101567855 A | 10/2009 |
| CN | 102714633 | 10/2012 |

(Continued)

OTHER PUBLICATIONS

ZTE Corporation, Extended European Search Report, EP 20837606.1, Jun. 1, 2022, 9 pgs.

(Continued)

Primary Examiner — Won Tae C Kim
(74) Attorney, Agent, or Firm — NZ CARR LAW OFFICE

(57) ABSTRACT

A packet processing method and related devices are disclosed. The method includes step of slicing and encapsulating a client packet based on a preset slice length, and adding a tag value to each slice, here the tag value is used to identify characteristic information of the client packet in the slice; and then outputting encapsulated slices.

17 Claims, 8 Drawing Sheets

A client packet is sliced and encapsulated based on a preset slice length, and a tag value is added to each slice. — S101

Encapsulated slices are output. — S102

(51) Int. Cl.
  *H04L 47/31* (2022.01)
  *H04L 47/34* (2022.01)
  *H04L 47/36* (2022.01)

(56) References Cited

U.S. PATENT DOCUMENTS

| 2010/0014510 | A1  | 1/2010 | Boreli et al. |
| 2012/0166582 | A1* | 6/2012 | Binder ................ G06F 21/602 709/217 |
| 2013/0250946 | A1* | 9/2013 | Meng ................... H04L 1/0009 370/389 |
| 2020/0059436 | A1* | 2/2020 | Chen ....................... H04L 67/60 |
| 2020/0259755 | A1* | 8/2020 | Wang ...................... H04L 47/10 |
| 2022/0116486 | A1* | 4/2022 | Lin ........................ H04J 3/1658 |

FOREIGN PATENT DOCUMENTS

| CN | 102714633 A  | 10/2012 |
| CN | 105743616    | 7/2016  |
| CN | 105743616 A  | 7/2016  |
| CN | 107395504    | 11/2017 |
| CN | 108600254 A  | 9/2018  |
| JP | 2020518172 A | 6/2020  |
| WO | 2018195728 A1| 11/2018 |
| WO | 2019216033   | 11/2019 |

OTHER PUBLICATIONS

Cisco Systems, "Reducing Latency and Jitter for Real-Time Traffic Using Multilink PPP", Mar. 21, 2011, 8 pgs., retrieved from the Internet: URL:http://www.cisco.com/en/US/docs/ios/qos/configuration/guide/reducing_latency.pdf.

ZTE Corporation, International Search Report with English Translation, PCT/CN2020/094646, Aug. 28, 2020, 6 pgs.

* cited by examiner

PACKET PROCESSING METHOD AND RELATED DEVICES

CROSS REFERENCE TO RELATED APPLICATIONS

The present application is United States National Stage Application filed under 35 U.S.C., § 371 of PCT Patent Application No. PCT/CN2020/094646, filed on Jun. 5, 2020, which claims priority to Chinese patent application No. 201910615340.8, filed on Jul. 9, 2019, each of which is hereby incorporated by reference in its entirety.

TECHNICAL FIELD

The present disclosure relates to the field of communications, in particular to a packet processing method and related devices.

BACKGROUND

With the rapid development of Internet technologies, the transmission information content on the network has changed from voice services to data services, and the communication network has changed from a synchronous digital hierarchy (SDH) technology network for voice services to an Ethernet technology network for data packets. At present, a length of an ordinary Ethernet packet is not a fixed value (ranging from 64 bytes to 9600 bytes). Therefore, packets of various lengths may be mixed in a packet flow during network transmission of the packets. During packet processing, a processing time of the packets inside a device is uncertain, causing a delay time of the packet processing to be uncertain, thereby resulting in a large delay time and a large delay jitter.

SUMMARY

The present disclosure provides a packet processing method and related devices.

Some embodiments of the present disclosure provide a client packet processing method, applicable for a source node device. The method includes: slicing and encapsulating a client packet based on a preset slice length, and adding a tag value to each slice, here the tag value is used to identify characteristic information of the client packet in the slice; and then outputting encapsulated slices.

Some embodiments of the present disclosure provide a packet processing method, applicable for an intermediate node device. The method includes: determining whether a slice received after encapsulated is subjected to a pass-through operation or a final operation; in response to the pass-through operation is performed for the slice, scheduling and outputting the slice based on a tag value carried in the slice.

Some embodiments of the present disclosure provide a packet processing method, applicable for a sink node device. The method includes: determining whether a slice received after encapsulated is subjected to a pass-through operation or a final operation; in response to the final operation is performed for the slice, reorganizing a slice packet based on the tag value carried by the slice, and restoring a client packet.

Some embodiments of the present disclosure provide a packet processing apparatus, applicable for a source node device. The apparatus includes: a slicing unit, configured to slice and encapsulate a client packet based on a preset slice length, and add a tag value to each slice, here the tag value is used to identify characteristic information of the client packet in the slice; and an output unit, configured to output encapsulated slices.

Some embodiments of the present disclosure provide a packet processing apparatus, applicable for an intermediate node device. The apparatus includes: a first determining unit, configured to determine whether a received encapsulated slice is subjected a pass-through operation or a final operation, in response to the pass-through operation is performed for the slice, trigger a first processing unit; and the first processing unit, configured to schedule and output the slice based on the tag value carried in the slice.

Some embodiments of the present disclosure provide a packet processing apparatus, applicable for a sink node device. The apparatus includes: a second determining unit, configured to determine whether a received encapsulated slice is subjected to a pass-through operation or a final operation, in response to the final operation is performed for the slice, trigger a second processing unit; the second processing unit, configured to reorganize a slice packet based on the tag value carried by the slice, and restore a client packet.

Some embodiments of the present disclosure also provide a computer-readable storage medium, storing a computer program that, when executed by a processor, allows the processor to perform the steps of any one of the above-mentioned methods.

Some embodiments of the present disclosure also provide a source node device, including: a memory, a processor, and a computer program stored on the memory and capable of running on the processor. The computer program, when executed by the processor, allows the processor to perform the steps of any one of the methods on the source node device side.

Some embodiments of the present disclosure also provide an intermediate node device, including: a memory, a processor, and a computer program stored on the memory and capable of running on the processor. The computer program, when executed by the processor, allows the processor to perform the steps of any one of the methods on the intermediate node device side.

Some embodiments of the present disclosure also provide a sink node device, including: a memory, a processor, and a computer program stored on the memory and capable of running on the processor. The computer program, when executed by the processor, allows the processor to perform the steps of any one of the methods on the sink node device side.

DETAILED DESCRIPTION

In order to solve the problem of delay jitter caused by indefinite delay time of packet processing due to different packet lengths in existing technologies, the present disclosure provides a packet processing method which slices and encapsulates a client packet based on a preset slice length, so that lengths of all slices are the same, lengths of slices waiting to be scheduled in all queues are the same, and scheduling time of each slice is equal. Therefore, there is no preemption of scheduling resources or congestion among slices. Deterministic delayed output of the packets can be realized, and delay jitter is avoided. The present disclosure will be further described in detail below in conjunction with the drawings and embodiments. It should be understood that the specific embodiments described here are only used to explain the present disclosure, and do not limit the present disclosure.

Figure 1:
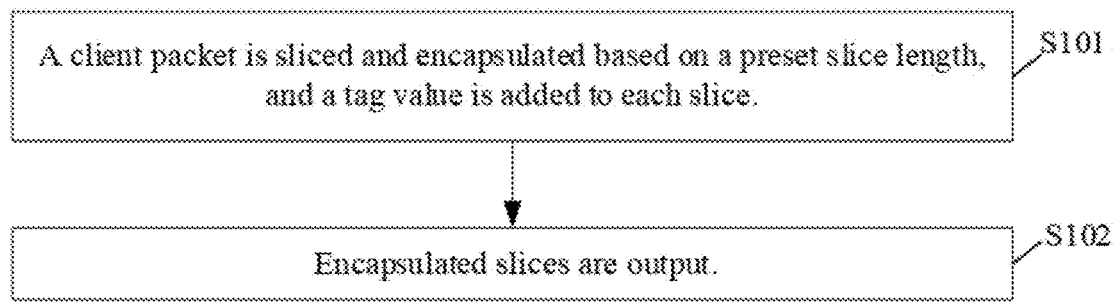
FIG. 1 is a flowchart of a client packet processing method in a first embodiment of the present disclosure.

A first embodiment of the present disclosure provides a packet processing method, applicable for a source node device side. The flow of the method is shown in FIG. 1, and includes steps S101 to S102.

In S101, a client packet is sliced and encapsulated based on a preset slice length, and a tag value tag is added to each slice.

Specifically, in the embodiment of the present disclosure, packets of a same client is sliced and encapsulated based on the preset slice length respectively, and a tag value field is added to identify characteristic information of the client packet in the slice. The tag value includes a packet flow number (flow id) and a slice sequence number (flow sq). The packet flow number is used to identify the client to which the slice belongs. During a slice transmitting process, an intermediate node and a sink node determine whether the slice is subjected to a pass-through operation or a final operation based on the packet flow number. That is, the intermediate node and the sink node determine whether the slice is subjected to a forwarding operation or a reorganizing operation based on the packet flow number. The slice sequence number is used to identify a sequence of the slice, and the sink node subsequently reorganizes the client packet based on the slice sequence number.

In S102, encapsulated slices are output.

Generally speaking, the embodiment of the present disclosure slices and encapsulates the client packet according to the preset slice length, so that lengths of all slices are the same, and lengths of slices waiting to be scheduled in all queues are the same, and scheduling time of each slice is equal. Therefore, there is no preemption of scheduling resources or congestion among slices. Deterministic delayed output of the packets is realized, delay jitter is avoided.

Figure 2:
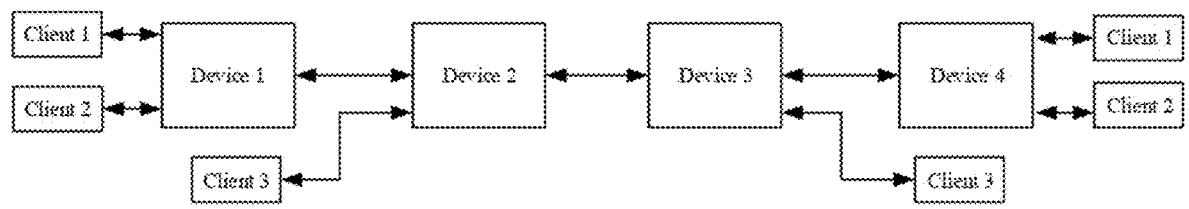
FIG. 2 is a schematic diagram of a packet transmission process in an existing Ethernet.

FIG. 2 is a schematic diagram of a packet transmission process in an existing Ethernet network. As shown in FIG. 2, there are three pairs of clients transmitting information through the network, the three pairs of clients shares a common transmission path on the network, and several different client service packets may converge and share the same physical path. Since packets of different clients are randomly transmitted, when the packets of several clients arrive at a rendezvous point at the same time, congestion may occur. However, a current Ethernet standard specifies that a length of an Ethernet packet is 64-9600 bytes, and packets of various lengths are mixed together for transmission. In a network system, when packets from different ports in a device converge to one port at the same time, congestion may occur, which may cause delay and jitter during the packet transmission process and reduce transmission performance index of the network.

Figure 3:
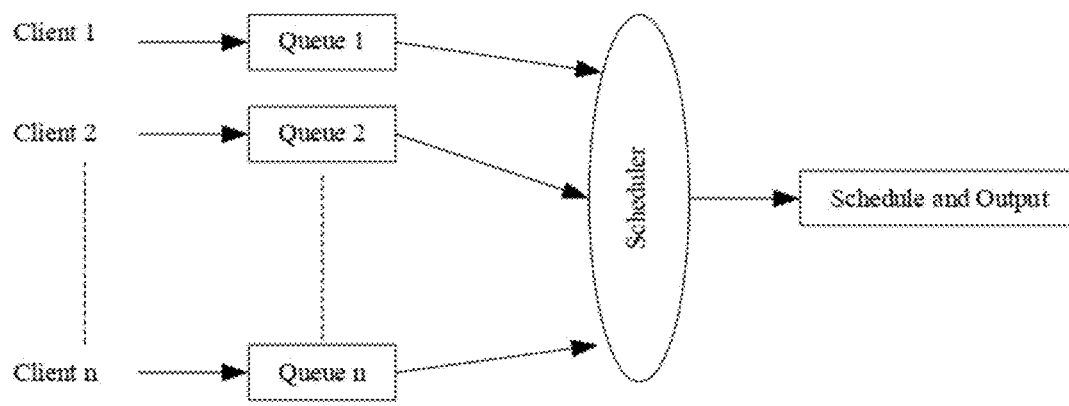
FIG. 3 is a schematic diagram of outputting an existing Ethernet packet through a scheduler.

Based on the congestion problem, a current solution is to set different priorities for the client packets. As shown in FIG. 3, when all received client packets are queued up in their respective queues, a scheduler performs a scheduling and output based on the priority, polling and other mechanisms. In order to improve transmission performance of the packets, packet priority is established in the standard to treat the client packets differently. Packets with different priorities enjoy different scheduling priority levels, and high-priority packets have priority scheduling rights than low-priority packets. Even if the packets are treated differently based on priority, the different treatment may only be guaranteed when applying for the scheduler, but not when the scheduling service is in progress. In this case, there may be a phenomenon that a low-priority long packet that are being scheduled and output may block a subsequent high-priority short packet. For example, the low-priority long packet is being scheduled for output, at this time, the high-priority short packet needs to be scheduled and output. Although the high-priority packet has a high scheduling priority level, the low-priority long packet is being output. The high-priority packet is unable to be scheduled and output until the low-priority packet has been sent, so as to avoid low-priority interruption. Since lengths of the low-priority packets are random, waiting time for the high-priority packets is uncertain, which brings uncertain delay time. When a packet is transmitted through multiple sites, there may be uncertain delay time and jitter at each of the multiple sites. The delay time and jitter of the multiple sites may be superimposed and accumulated, resulting in a large total delay time and jitter of the entire network and affecting transmission quality of the packet.

It can be seen that even by setting different priorities of client packets, the problem of delay time and delay jitter caused by different packet lengths is unable to be solved.

Figure 4:
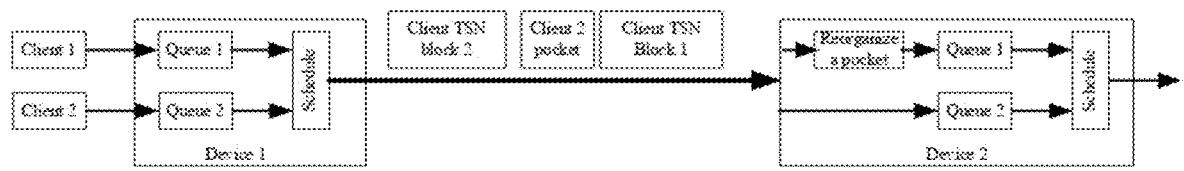
FIG. 4 is a schematic diagram of a packet sequence relationship after preemption by an existing time sensitive network (TSN) technology.

Based on this, time-sensitive networking (TSN) technology is usually introduced into the network, that is, the high-priority packets may interrupt the low-priority packets being sent, and the queue is preempted to send high-priority packets. After sending the high-priority packets by preemption, interrupted low-priority packets are resent. FIG. 4 shows a format of a slice packet of a TSN protocol. Client 1 is the low-priority packet. If the client 1 packet is scheduled and output and a high-priority client 2 packet has arrived, the current client 1 packet would be interrupted, and the client 2 packet preempts the scheduler to output. After the client 2 packet is scheduled and output by preemption, the interrupted client 1 packet is continued to schedule. On a link, the client 1 packet is not a complete packet, but is composed of many TSN slices, and the client 2 is a complete Ethernet, and is interleaved between the TSN slices of the client 1.

The TSN slices of the received low-priority packets are reorganized in a next network equipment site to restore an original packet. It can be seen that the TSN technology may enable the high-priority packets to preempt scheduling and output opportunities of the low-priority packets and reduce the delay and waiting time of the high-priority packets. However, the TSN technology is only limited to the execution of packet interruption and restoration between two adjacent devices. Each device needs to perform the restoration of the TSN slices interrupted from an upstream site, and the TSN slices may be re-interrupted when sent to a downstream device. If the device repeatedly performs interruption and recovery operations, the cost is high.

In response to this problem, the present disclosure provides a solution that the source node device only performs slice encapsulation work, and the intermediate node device does not reorganize the slice, until the sink node device, which avoids the problem that all subsequent node devices have to perform interruption and recovery operations on the slice.

In addition, since the TSN technology randomly interrupts the packet and lengths of the interrupted TSN slices are not equal, the scheduler is unable to predict each scheduling time, perform the scheduling output at a fixed time, or achieve deterministic delayed output.

In other words, the TSN technology makes lengths of TSN slices unequal, which may also cause the delay time of packet processing to be uncertain, thereby causing the problem of delay jitter.

In view of the problem that the different packet lengths and different TSN slice lengths in the existing packets make the delay time of packet processing uncertain and cause the delay jitter, the embodiment of the present disclosure slices and encapsulates the client packet based on a preset slice length, so that all the lengths of the slices are the same, the lengths of the slices waiting to be scheduled in all queues are the same and the scheduling time of each slice is the same. Therefore, there is no preemption of scheduling resources or congestion among the slices. Deterministic delayed output can be realized, and the problem of delay jitter caused by the uncertain delay time of packet processing due to different packet lengths can be avoided.

In addition, the TSN technology is only limited to interrupting the low-priority packets and the high-priority packets may not be interrupted. However, the high-priority packets may also have the problem of preempting the scheduler and causing delays. The embodiment of the present disclosure performs interruption and slicing operation to all the packets based on the preset slice length, so that the lengths of all the slices are the same. Subsequently, a preset sending time and a preset sending rate are set (that is, a constant sending rate) to output the encapsulated slices, then each device in the network may realize scheduling processing at a fixed time when processing client flow slices, so as to realize deterministic delay.

That is to say, the embodiment of the present disclosure provides a packet transmission method, which solves the shortcomings of existing packets and TSN technology. The packet transmission method only needs to perform the packet interruption and slicing operation on the source device on the network, and performs packet reorganization and recovery operations on the sink node device, and do not need to perform packet interruption and slicing, recovery and reorganization activities on the intermediate device on the network, which greatly reduces the cost of network equipment, realizes sending and output of packets scheduled at a fixed time, and reaches the purpose of the deterministic delay of the packet.

Figure 5:
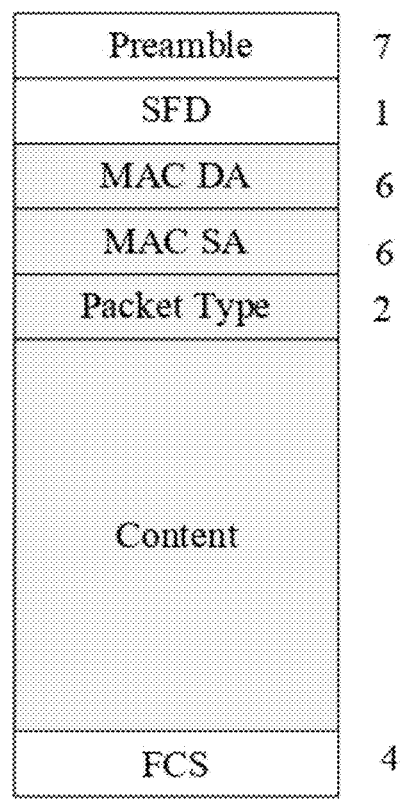
FIG. 5 is a schematic structural diagram of an existing ordinary Ethernet packet.

FIG. 5 shows a structure of an ordinary Ethernet packet. The packet consists of a 7-byte preamble (which has a length ranging from 5-byte to 7-byte, usually 7-byte, and the content of the preamble byte is fixed in hexadecimal 0x55. The contents of the bytes in the text are uniformly expressed in hexadecimal), a 1-byte start frame delimiter (SFD), and a 6-byte destination MAC (medium access control) address (MAC DA), a 6-byte source MAC address (MAC SA), a 2-byte packet type (ethertype), variable-byte length content (data) and a 4-byte check code (frame check sequence, referred to as "FCS"). The content starting from the destination address to the last check code byte is a main part of the Ethernet packet. The preceding preamble and start frame delimiter are start signs of the packet and do not carry useful information of the client packet.

Figure 6:
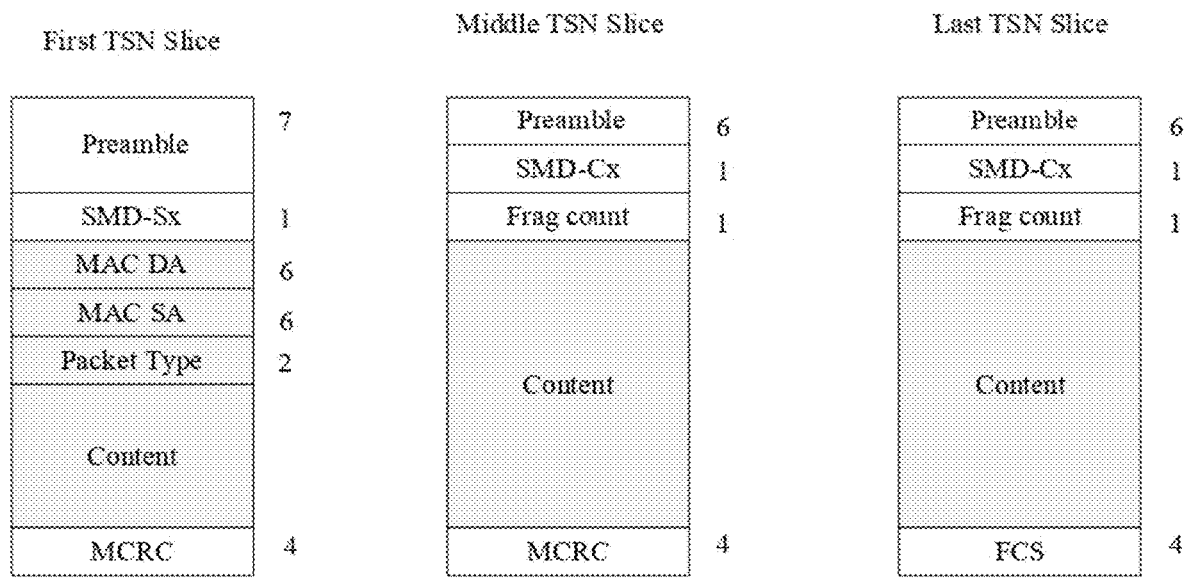
FIG. 6 is a schematic structural diagram of a TSN slice after interruption by an existing TSN technology.

In TSN technology, the low-priority packet may be interrupted by the high-priority packet, even be interrupted for multiple times during transmission. In this case, the original client packet is divided into multiple TSN slices after multiple interruptions, as shown in FIG. 6. A leftmost part of the figure is a first TSN slice, the preamble remains unchanged, the start frame delimiter becomes SMD-Sx, the following in the slice is the source address, the destination address of the client packet, and a front part of data content, and the last is MCRC. MCRC is a CRC (cyclic redundancy check) check value of this TSN slice. A middle part of FIG. 6 is a middle TSN slice, the preamble is composed of 6 bytes, then the start frame delimiter SMD-Cx, a slice sequence counter frag count, followed by part content of the original client packet, and finally the slice check value MCRC. A right part in FIG. 6 is a last TSN slice. The preamble, the start frame delimiter SMD-Cx, and the slice sequence counter frag count have the same structure as the middle TSN slice, followed by a last part of the client packet and the CRC value of the original client packet.

The start frame delimiter of the first TSN slice has four values: S0, S1, S2, and S3. Each client may select one of the values. Therefore, the TSN technology may simultaneously support 4 low-priority client flows to be interrupted into TSN slices at the same time. The start frame delimiter SMD-Cx of the subsequent TSN slice also has four values: C0, C1, C2, C3, which has a one-to-one correspondence with the start frame delimiter of the first TSN slice: S0→C0, S1→C1, S2→C2, S3→C3. If the start frame delimiter of the first TSN slice of one client packet selects S2, the start frame delimiter of the subsequent TSN slice selects C2. When one packet is interrupted into multiple TSN slices, the frag count field is used to mark a sequence relationship of the slices. The frag count field has four values that are used in cycles to indicate the sequence relationship of the multiple slices. See Table 1 and Table 2 for details of the SMD-Dx, SMD-Cx, and the frag count field.

TABLE 1

| Packet type | Notation | Frame count | Value |
|---|---|---|---|
| Preemptable Packet start | SMD-S0 | 0 | 0xE6 |
|  | SMD-S1 | 1 | 0x4C |
|  | SMD-S2 | 2 | 0x7F |
|  | SMD-S3 | 3 | 0xB3 |
| Continuation Fragment | SMC-C0 | 0 | 0x61 |
|  | SMC-C1 | 1 | 0x52 |
|  | SMC-C2 | 2 | 0x9E |
|  | SMC-C3 | 3 | 0x2A |

TABLE 2

| Frag_count | Value |
|---|---|
| 0 | 0xE6 |
| 1 | 0x4C |
| 2 | 0x7F |
| 3 | 0xB3 |

Although the TSN technology may enable the high-priority packet to preempt the low-priority packet for preferential sending to achieve low-delay transmission of the high-priority packet, with the TSN technology, each device in the network gradually preempts and interrupts the packet, and regenerates the packet. One low-priority client packet may be interrupted and reorganized in each device, the circuit is complicated and the cost is high. Moreover, the interruption of the TSN technology is carried out randomly, and lengths of packet fragments after the interruption are different, which is unable to meet timing scheduling and deterministic delay requirements.

Figure 7:
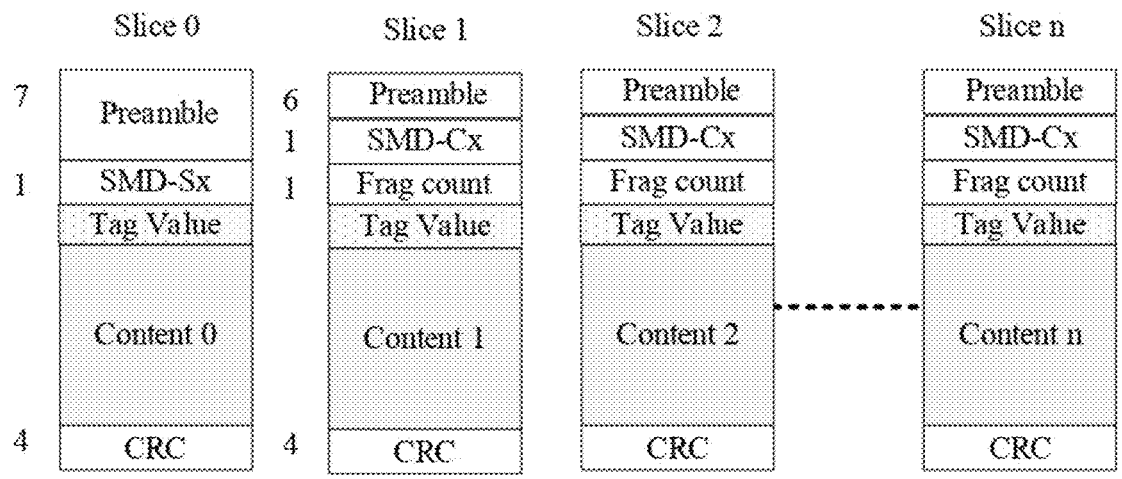
FIG. 7 is a schematic structural diagram of a first TSN slicing scheme in a first embodiment of the present disclosure.

The embodiment of the present disclosure is based on the TSN technology, and uses the TSN technology to slice all the packets (including the high-priority packet) at a sending end, and slices the client packet into a format shown in FIG. 7.

It should be noted that the slice format in FIG. 7 of the embodiment of the present disclosure is to correspond to the existing TSN technology, so the preamble, the start frame delimiter, and the slice sequence counter are also provided. In specific implementation, the above content may not be set, and only the tag value used to identify the characteristic information of the client packet may be set.

In the embodiment of the present disclosure, all the high-priority and low-priority packets are sliced and encapsulated based on the TSN preemption mechanism. The preamble, the start frame delimiter of the slice, content carried by the client packet, and the check field may adopt the slice format of TSN, as shown in FIG. 7. A difference between the slice format of the embodiment of the present disclosure and the traditional TSN technology is that an additional tag value tag field is added to the slice to identify the characteristic information of the client flow.

Figure 8:
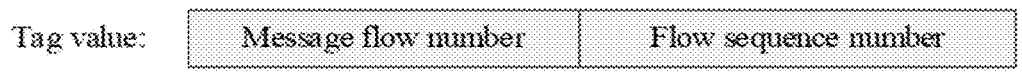
FIG. 8 is a schematic structural diagram of a tag field of a slice in a first embodiment of the present disclosure.

When the original client packet is sliced by using TSN technology at the sending end, the tag value tag field is added to the TSN slice. As shown in FIG. 8, the tag value may include but is not limited to: a client packet flow number flow id, a flow sequence number flow sq. The flow id represents a number of the client packet flow, which determines the client the TSN slice belongs to. Each device determines the processing operation method of the service flow (pass-through or final, output port, processing speed, etc.) based on the flow number. The flow sq is used to determine the sequence relationship of TSN blocks, avoiding a phenomenon of disordered slices. The flow sq may also be used to sort the disordered slices.

In specific implementation, a first length of a first client packet in the slice and a next valid indicating whether a sequent client packet is valid, may also be set in the tag value. Herein, the first length field provides an effective length of the first client packet in the slice, and the next valid field indicates whether there is a next client packet after the first client packet. Alternatively, it is also possible to set length of each packet in the slice to avoid disorder in reorganization.

Since fixed-length slices may realize fixed-time scheduling, this embodiment of the present disclosure only uses the fixed-length slices as an example for description. Alternatively, in specific implementation, those skilled in the art may also set the slices to be non-fixed length according to actual needs. In a case of using the fixed-length slices, the effective length of the first packet may be provided by the tag value in the slice, or the length information may be set before the first packet.

When information amount of the client packet is less than the preset slice length, the positions that fall short of the preset slice length are filled with idle information for encapsulation. That is, when the information amount of the first client packet is less than one slice, idle stuffing information is filled after the first packet in the slice to keep the length of the slice fixed and unchanged.

When one slice includes multiple client packets of the same client, a length of the client packet is encapsulated before each client packet in the slice. Specifically, when there is multiple client packets in one slice, a length of a next packet and content of the next packet are encapsulated after a previous packet. The operations are performed in sequence to realize the encapsulation of all the client packets in the slice. Finally, the CRC value of the slice is calculated and encapsulated. The encapsulated slices of each client flow may be sent out at a constant rate, so that a slice speed of each client flow on the network is always constant, and each device in the network can realize fixed-time scheduling processing when processing client flow slices and achieve deterministic time delay.

In the embodiment of the present disclosure, front fields of a first slice of the client packet is set as a preamble field, a first start frame delimiter SMD-SX field (that is, the start frame delimiter of the first slice) and a tag value field based on the TSN protocol. Front fields of subsequent slices of the client packet are the preamble field and a second start frame delimiter SMD-CX field (that is, the start frame delimiter of the subsequent slice. Since the start frame delimiter is a technology used by the existing TSN, reference may be made to the description of TSN technology in this article for details. In addition, in order to be consistent with the existing statement, the present disclosure refers to the first start frame delimiter and the second start frame delimiter collectively as the start frame delimiter) and the tag value field.

Alternatively, based on the TSN protocol setting, the front fields of the first slice of the client packet are the preamble field, the start frame delimiter SMD-SX field, and the tag value field, and the front fields of the subsequent slices of the client packet are the preamble field, the start frame delimiter SMD-CX field, the slice sequence counter frag count field, and the tag value field.

It should be noted that since the slice sequence number already exists in the tag value, and function of the slice sequence number is the same as that of the slice sequence counter frag count, the present disclosure may not set the slice sequence counter frag count field in the slice. However, in order to apply the method of the present disclosure in the TSN technology, the slice sequence counter frag count field may still be retained in the slice. In this case, the tag value in the embodiment of the present disclosure may also be set to only have a packet flow number indicating the client to replace the slice sequence number, or the slice sequence counter frag count field and the slice sequence number field may be reserved at the same time.

In addition, positions of the frag count field and the tag value field of the slice sequence counter in subsequent slices of the client packet in the embodiment of the present disclosure may be exchanged.

Figure 9:
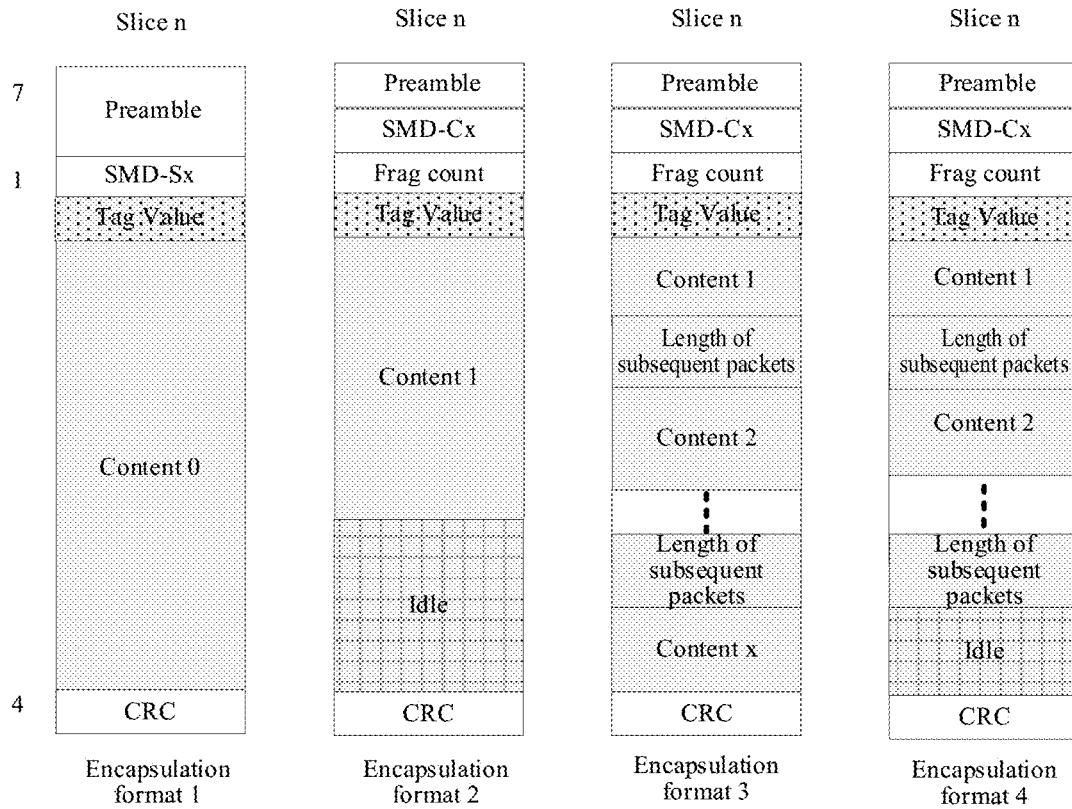
FIG. 9 is a schematic structural diagram of a client packet carried by a TSN slice in a first embodiment of the present disclosure.

In the embodiment of the present disclosure, after the original client packet is sliced at a fixed length, the slices have multiple structures. As shown in FIG. 9, in encapsulation format 1, the first length value of the tag value field in the slice is equal to a slice carrying capacity, and the data part in the TSN slice is the entire packet or part of the packet of one client packet. If part of the packet content is carried in this TSN slice, a remaining part of the content of the previous client packet is carried in the subsequent TSN slice. In encapsulation format 2, the first length value of the tag value field is less than a total carrying capacity of the slice, and content of the next valid field is invalid, which means that the front part of the TSN slice carries the original client packet, and the subsequent part is an idle filling part (which needs to be discarded at a receiving end). In encapsulation format 3, the first length value of the tag value field is less than a total carrying length of the slice, and the content of the next valid field is valid, which means that the front part of the TSN block carries one original client packet, and the subsequent part is another client packet. For the TSN slice of the encapsulation format 3, after extracting and reorganizing the first packet, the receiving end continues to extract the next length field of the next packet, then obtains the packet content after the length field of the next packet, and reorganizes a second client packet. After the previous packet is extracted and reorganized every time, the length value of the next packet is extracted to reorganize the next packet until the reorganization and restoration of all the client packets is completed in turn. In encapsulation format 4, the first length of the tag value field is less than the total carrying length of the slice, and the content of the next valid field is valid, indicating that the front part of the TSN slice carries the previous original client packet, and the subsequent part is another client packet, which is similar to the encapsulation format 3. The difference is that in the subsequent processing of the encapsulation format 4, after the previous packet is extracted, the length "next length" of the subsequent packet is 0, which means that there is no subsequent client packet, and the operation of reorganizing the next packet is stopped.

Figure 10:
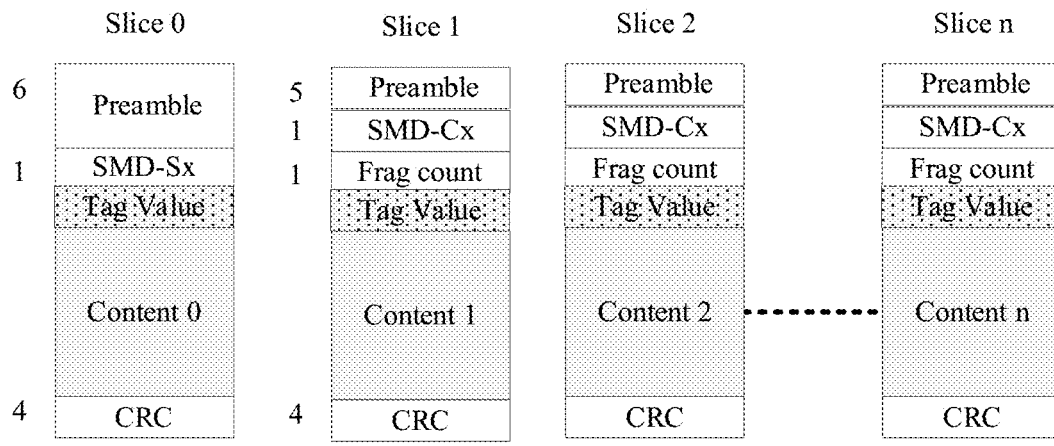
FIG. 10 is a schematic structural diagram of a second TSN slicing scheme in a first embodiment of the present disclosure.

In the Ethernet standard, the standard value of the length of the preamble field is 7 bytes (content is 0x55), and the range of 5-7 bytes may be accepted in actual application. As long as the length of the preamble byte is not less than 5 bytes, the preamble is valid. The present disclosure uses the TSN technology to slice and encapsulate the client packet. The tag field is added to the encapsulation. After the tag field is added, the proportion of data field in the slice decreases in the entire slice, and efficiency of the slice to carry the client packets decreases. In application, a number of preamble fields may be reduced to keep the carrying efficiency of the slice unchanged. As shown in FIG. 10, the embodiment of the present disclosure reduces the preamble of the first TSN block from 7 bytes to 6 bytes, and reduces the preamble of the subsequent TSN block from 6 bytes to 5 bytes. In this way, in a case that the total length of the slice remains the same, the proportion of the data field in the slice remains the same, and the carrying efficiency of the slice remains the same.

Figure 11:
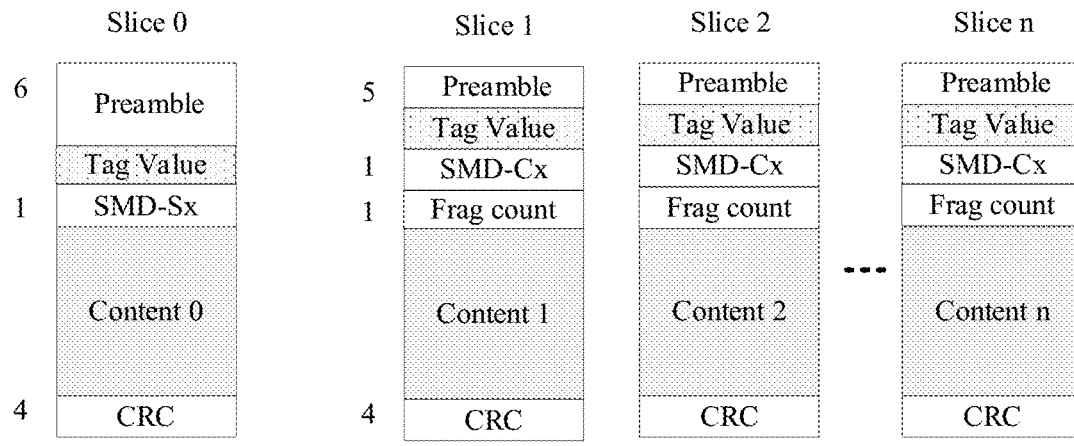
FIG. 11 is a schematic structural diagram of a third TSN slicing scheme in a first embodiment of the present disclosure.
Figure 12:
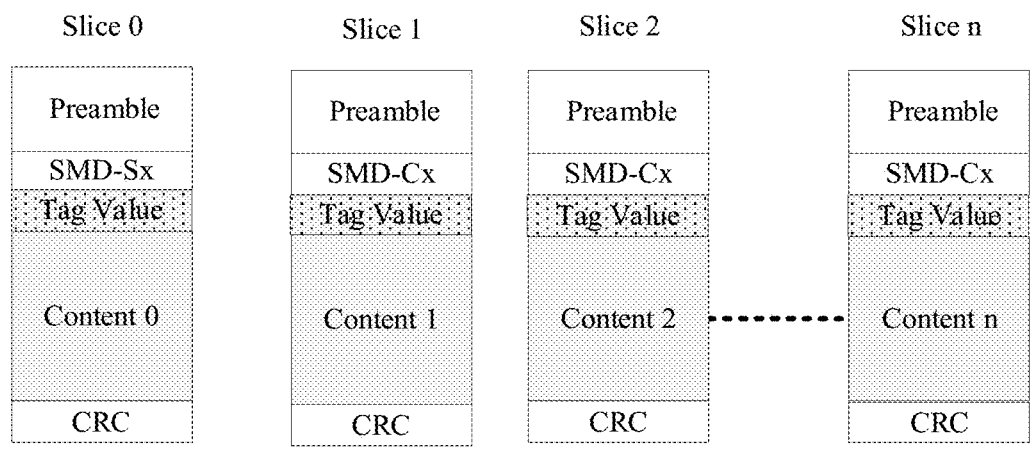
FIG. 12 is a schematic structural diagram of a fourth TSN slicing scheme in a first embodiment of the present disclosure.

As shown in FIG. 11, the tag field in the slice in an application may be located after the SMD-Sx (or SMD-Cx) field of the standard TSN block, or before the SMD-Sx (or SMD-Cx). After the tag field is added to the TSN slice, the tag field may replace the function of the frag count field in the TSN standard. In practical applications, the frag count field may be omitted to simplify the TSN slice. As shown in FIG. 12, after removing the frag count field, the efficiency of carrying the client packets by the TSN slice may be improved. The change in the number of the preamble field, the change in the position of the tag value, and the deletion of the frag count field are all different specific implementations of the present disclosure, which fall within the scope of the present disclosure.

In order to better explain and describe the method described in the embodiment of the present disclosure in detail, a specific example will be used to illustrate the method described in the present disclosure below.

The packet processing method provided in the embodiment of the present disclosure includes following steps.

In step 1, an original client packet is sliced at a sending end of a source node device, sent and output after a preamble and a start frame delimiter, and a tag value are added.

Herein, in the embodiment of the present disclosure, client packet information carried by the network may be an Ethernet MAC packet, which is sliced; or may be a coding block of a PCS (physical coding sublayer) layer which is also sliced. Fixed-length slices or variable-length slices may be used.

Information such as the preamble and delimiter of the slice may borrow a slice format of the TSN technology, or use other content formats. The content of the added flag value includes, but is not limited to: a packet flow number, and a slice sequence number of the packet stream.

In a case of using a fixed-length to slice and encapsulate, an effective length of a first packet may be provided in the tag value, or the length may be provided directly before the first packet. When the information amount of the first client packet is less than one slice, positions after the first packet in the slice are filled with idle information to keep the fixed length of the slice unchanged. When there are multiple client packets in one slice, a length of a next packet and content of the next packet are encapsulated after a previous packet, and the operations are performed in sequence to realize the encapsulation of all client packets in the slice. Finally, a slice CRC check value is calculated and encapsulated.

The source node device may send slices of each client flow at a fixed rate to ensure that a slice speed of each client flow in the network is constant. Each device in the network can realize fixed-time scheduling processing and achieve deterministic delay.

In step 2, in an intermediate device in the network, the slices are received based on the preamble and the delimiter, and are directly scheduled and output based on the tag value carried in the slices, and the original client packet is not restored.

Specifically, in the embodiment of the present disclosure, the intermediate device in the network determines that the received packet is a slice packet based on the preamble and the delimiter fields of the received packet, extracts the tag value in the slice packet, and determines the packet flow number, packet slice sequence number and other information. Then the network intermediate device determines that the packet is a forwarding packet based on the packet flow number, and a scheduler forwards the packet to an output port based on the packet flow number. The scheduler may be a priority scheduler, a weighted round-robin scheduler and other schedulers. The scheduler is also a timing scheduler which schedules and outputs a corresponding packet at a fixed time in a fixed cycle. A receiving end of a sink node device in the network receives the slices based on the preamble and the delimiter, reorganizes the slice packet based on the tag value carried in the slice, restores and outputs the original client packet.

In step 3, the receiving end of the sink node device in the network receives the slices based on the preamble and the delimiter, reorganizes the slice packet based on the tag values carried in the slice, restores and outputs the original client packet.

Specifically, in the embodiment of the present disclosure, the receiving end of the sink node device determines that the packet is the slice packet based on the preamble and the delimiter field of the received packet, extracts the tag value in the slice packet, and determines the packet flow number and the packet slice sequence number and other information. The receiving end of the sink node device determines that the packet is a final packet based on the packet flow number, sorts the slices based on the sequence number, extracts the carried content in the slice, reorganizes and restores the original client packet and send the original client packet to a client port.

In general, the packet processing method described in the embodiment of the present disclosure has the following advantages.

The embodiment of the present disclosure only needs to perform packet interruption and slicing operations on the source node device in the network, and perform packet reorganization and restoration operations on the sink node device. The intermediate device in the network does not need to perform activities of reorganizing and restoring the client service packet, but directly performs the scheduling processing based on the slice block, so the present disclosure can reduce packet transmission cost and improve packet transmission efficiency. In addition, the embodiment of the present disclosure interrupts and slices all the client service flows in advance, adds tags in the slice to mark client service flow attributes, sequence number, carrying method and other information. The tag determines the slice processing method and may support any number of client flows. Therefore, the implementation manner of the embodiment of the present disclosure can greatly reduce cost of network equipment, realize the sending and output of the packet scheduled at a fixed time, and achieve the purpose of deterministic delay of the packet.

Figure 13:
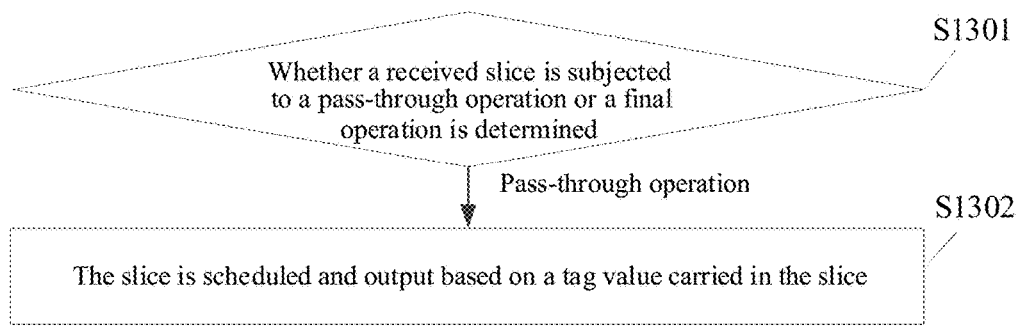
FIG. 13 is a flowchart of a client packet processing method in a second embodiment of the present disclosure.

A second embodiment of the present disclosure provides a packet processing method, applicable for an intermediate node device. Referring to FIG. 13, the method includes following steps.

In S1301, whether a received slice is subjected to a pass-through operation or a final operation is determined, and if it is determined to perform the pass-through operation for the slice, a next step is performed.

In S1302, the slice is scheduled and output based on a tag value carried in the slice.

In other words, the intermediate node device only needs to determine whether the slice is subjected to the pass-through operation or the final operation, and does not need to reorganize the slice, thereby saving packet sending time and reducing sending cost.

In the embodiment of the present disclosure, the step of whether the received slice is subjected to the pass-through operation or the final operation is determined includes: parsing a tag value in the slice to obtain a packet flow number; and determining whether the slice is subjected to the pass-through operation or the final operation based on the packet flow number.

That is, in the embodiment of the present disclosure, whether the slice is subjected to the pass-through operation or the final operation is determined based on the packet flow number in the tag value of the slice, and the slice is subsequently scheduled and output based on the packet flow number.

Figure 14:
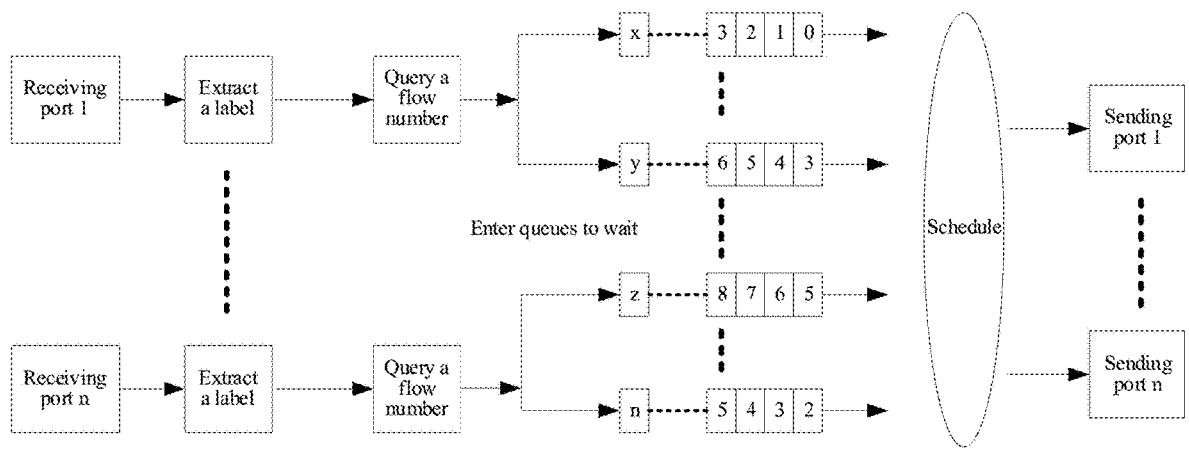
FIG. 14 is a schematic diagram of a process of processing a TSN slice by an intermediate device in a second embodiment of the present disclosure.

FIG. 14 is a schematic diagram of a process of processing TSN slices by an intermediate device in the second embodiment of the present disclosure. As shown in FIG. 14, in the intermediate device of the network, a receiving port receives the slices based on a TSN technology principle, extracts tag field information in the slices, look up a table based on the packet flow number in the tag field to determine whether the slices are subjected to the pass-through operation or the final operation (subjected to the pass-through operation in the intermediate device), and an output port of the pass-through operation. Then the slices enter queues to wait for being scheduled and output. When all the slices are of equal length, lengths of the slices waiting to be scheduled in all the queues are the same, and scheduling time of each of the slices is the same. If a speed of each slice flow is constant, a scheduler may schedule each slice flow at a fixed time in a scheduling cycle. In this way, there is no preemption of scheduling resources and congestion among the slice flows. At the same time, the speed of each slice flow is constant, each slice flow is scheduled and output at a fixed time, so as to achieve deterministic delayed output, and zero delay jitter. In specific applications, the scheduler plans a fixed scheduling time of each service flow in a scheduling polling cycle based on a constant speed value of each service flow, and the scheduler executes the scheduling and output at the respective fixed time of each service flow. An operating time of the scheduling is fixed and has nothing to do with an arrival time and congestion status of the service flow. The service flows do not interfere with each other. When a scheduling and output time of the service flow is fixed, the deterministic time delay is realized, and a delay jitter value of the service flow is zero.

The other relevant content of the embodiment of the present disclosure may refer to the relevant part of the first embodiment, which will not be discussed in detail here.

Figure 15:
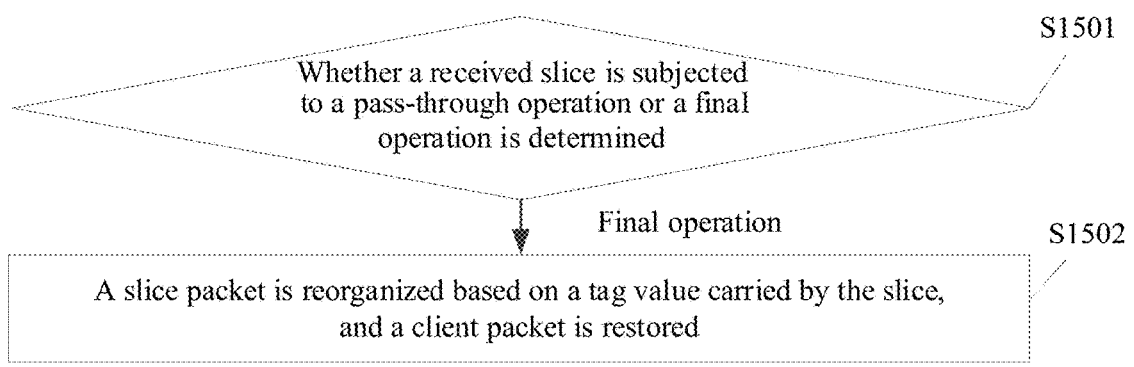
FIG. 15 is a flowchart of a client packet processing method in a third embodiment of the present disclosure.

A third embodiment of the present disclosure provides a packet processing method, applicable for a sink node device. Referring to FIG. 15, the method includes following steps.

In S1501, whether a received slice is subjected to a pass-through operation or a final operation is determined, and if it is determined to perform the final operation for the slice, the next step is performed.

In S1502, a slice packet is reorganized based on a tag value carried by the slice, and a client packet is restored.

That is to say, the embodiment of the present disclosure only performs slice reorganization on the sink node device, which can save packet sending time and reduce sending cost.

In the embodiment of the present disclosure, the step of whether the received slice is subjected to the pass-through operation or the final operation is determined includes: parsing the tag value in the slice to obtain a packet flow number; and determining whether the slice is subjected to the pass-through operation or the final operation based on the packet flow number.

That is, the embodiment of the present disclosure determines whether the slice is subjected to the pass-through operation or the final operation based on the packet flow number of the tag value in the slice.

In this embodiment of the present disclosure, the step of the slices is reorganized based on the tag value carried by the slice includes: parsing the tag value in the slices to obtain slice sequence numbers; obtaining a client packet based on the slice sequence numbers and slice reorganization.

In other words, the embodiment of the present disclosure reorganizes the slices based on the slice sequence number in the tag value, and finally obtains the client packet before segmentation.

Figure 16:
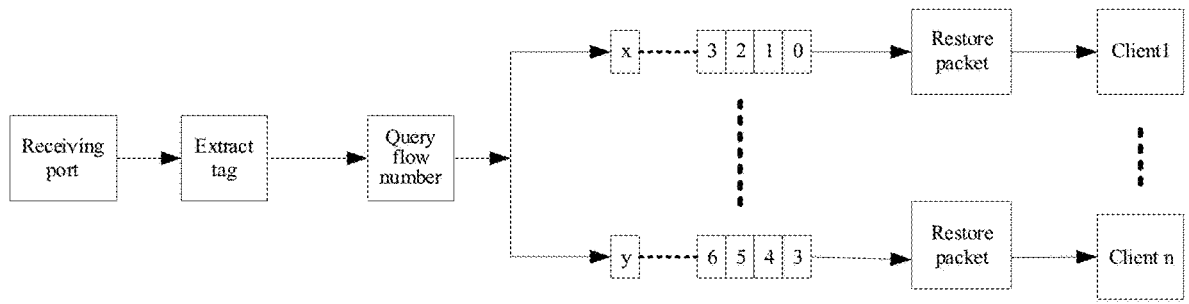
FIG. 16 is a schematic diagram of a process of restoring a client packet by a sink node device in a third embodiment of the present disclosure.

On the sink node device, a receiving port receives the slice based on the TSN technology, extracts tag field information in TSN slices, looks up a table based on packet flow number, and determines that the packet is subjected to the final operation and a landing operation. The slices are cached based on sequence numbers of the TSN slices to restore an original client packet. As shown in FIG. 16, a recovery module strips off encapsulated fields of the slice, extracts content of the client packet, and reorganizes an original client flow packet. Only part of a Data field in the slice may be the client packet, and remaining part is useless idle stuffing information. When the client packet is restored, the idle stuffing information needs to be deleted. In some cases, the Data field part may include two or more packets, and each client packet needs to be restored when the client packet is assembled and restored.

The other relevant content of the embodiment of the present disclosure may refer to the relevant part of the first embodiment, which will not be discussed in detail here.

Figure 17:
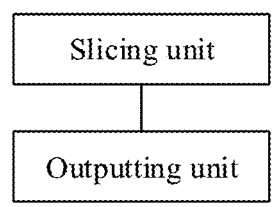
FIG. 17 is a schematic structural diagram of a processing apparatus for a client packet in a fourth embodiment of the present disclosure.

A fourth embodiment of the present disclosure provides a packet processing apparatus, applicable for a source node device. Referring to FIG. 17, the apparatus includes a slicing unit and an output unit that are coupled to each other.

The slicing unit is configured to slice and encapsulate a client packet based on a preset slice length, and add a tag value to each slice, here the tag value is used to identify characteristic information of the client packet in the slice.

Specifically, the embodiment of the present disclosure is to slice and encapsulate the packets of the same client based on the preset slice length, and add a tag value field to identify the characteristic information of the client packet in the slice. The tag value includes a packet flow number flow id and a slice sequence number flow sq. The packet flow number is used to identify a client to which the slice belongs. During a transmitting process of the slice, an intermediate node and a sink node determine whether the slice is subjected to a pass-through operation or a final operation based on the packet flow number. That is, the intermediate node and the sink node determine whether the slice is subjected to a forwarding operation or a reorganizing operation based on the packet flow number. The slice sequence number is used to identify the slice sequence, and subsequently the sink node reorganizes the client packet based on the slice sequence number.

The output unit is configured to output encapsulated slices.

Generally speaking, the embodiment of the present disclosure slices and encapsulates the client packet based on the preset slice length, so that lengths of all slices are the same, and lengths of slices waiting to be scheduled in all queues are the same, and scheduling time of each slice is equal. As a result, there is no preemption of scheduling resources or congestion among the slices. Deterministic delayed output of the packet can be realized, and delay jitter can be avoided.

The content of the tag value in the embodiment of the present disclosure includes, but is not limited to, one or more of the packet flow number and the slice sequence number.

In specific implementation, the slice in the embodiment of the present disclosure is also provided with a preamble, a start frame delimiter, and a slice sequence counter.

In the embodiment of the present disclosure, based on a TSN protocol, the slicing unit is further configured to set front fields of a first slice of the client packet as the preamble field, a first start frame delimiter SMD-SX field, and the tag value field; and set front fields of subsequent slices of the client packet as the preamble field, a second start frame delimiter SMD-CX field, and the tag value field.

Alternatively, in specific implementation, in order to correspond to an existing TSN protocol, those skilled in the art may set a slice sequence counter frag count field on subsequent slices.

In the embodiment of the present disclosure, the slicing unit is further configured to: fill positions that fall short of the preset slice length with idle information and then encapsulate when information amount of the client packet is less than the preset slice length; encapsulate a length of the client packet before each client packet in the slice when multiple client packets of the same client are included in the slice.

In other words, in order to achieve a fixed-length slice, when the packet is insufficient in length, idle information may be filled. When there are multiple packets for the client, the multiple packets may also be filled into the slice, and the length of the packet is tagged before each of the multiple packets so that the subsequent sink node may reorganize the packet.

In specific implementation, the slicing unit of the embodiment of the present disclosure is also configured to calculate a CRC check value of the slice, and encapsulate the CRC check value in the slice.

That is, the embodiment of the present disclosure calculates the CRC check value for each slice, encapsulates the CRC check value in the last part of the slice, and then outputs the slice.

In specific implementation, the output unit in the embodiment of the present disclosure outputs the encapsulated slice at a preset sending rate based on a preset sending time.

Since the slices in the embodiment of the present disclosure have a fixed length, the source node device may send the slice of each client flow at a fixed rate at a set time to ensure that a slice speed of each client flow in the network is constant, each device in the network may implement scheduling processing at a fixed time to achieve deterministic delay.

Figure 18:
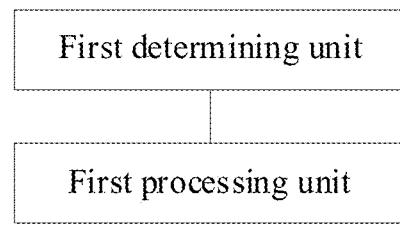
FIG. 18 is a schematic structural diagram of a processing apparatus for a client packet in a fifth embodiment of the present disclosure.

A fifth embodiment of the present disclosure provides a packet processing apparatus, applicable for an intermediate node device. Referring to FIG. 18, the packet processing apparatus includes:

a first determining unit, configured to determine whether a received slice is subjected to a pass-through operation or a final operation, and if it is determined to perform the pass-through operation for the slice, trigger a first processing unit; and the first processing unit, configured to schedule and output the slice based on a tag value carried in the slice.

In other words, the intermediate node device only needs to determine whether the slice is subjected to the pass-through operation or the final operation, and does not need to reorganize the slice, thereby saving packet sending time and reducing sending costs.

In the embodiment of the present disclosure, the first determining unit parses the tag value in the slice to obtain a packet flow number, and determines whether the slice is subjected to the pass-through operation or the final operation based on the packet flow number.

Moreover, the first processing unit in the embodiment of the present disclosure schedules and outputs the slice based on the packet flow number.

That is, the embodiment of the present disclosure determines whether the slice is subjected to the pass-through operation or the final operation based on the packet flow number in the tag value of the slice, and the slice is subsequently scheduled and output based on the packet flow number.

Figure 19:
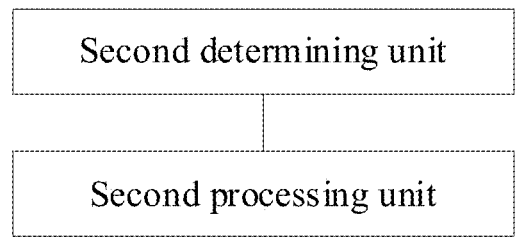
FIG. 19 is a schematic structural diagram of a processing apparatus for a client packet in a sixth embodiment of the present disclosure.

A sixth embodiment of the present disclosure provides a packet processing apparatus, applicable for a sink node device. Referring to FIG. 19, the packet processing apparatus includes:

a second determining unit, configured to determine whether a received slice is subjected to a pass-through operation or a final operation, and if it is determined to perform the final operation for the slice, trigger a second processing unit.

The second processing unit, is configured to reorganize a packet of the slice based on a tag value carried by the slice, and restore a client packet.

That is to say, the embodiment of the present disclosure only performs slice reorganization on the sink node device, thereby saving packet sending time and reducing sending costs.

In the embodiment of the present disclosure, the second determining unit parses the tag value in the slice to obtain a packet flow number, and determines whether the slice is subjected to the pass-through operation or the final operation based on the packet flow number.

That is, the embodiment of the present disclosure determines whether the slice is subjected to the pass-through operation or the final operation based on the packet flow number in the tag value of the slice.

In specific implementation, the second processing unit in the embodiment of the present disclosure is further configured to parse the tag value in the slice to obtain a slice sequence number, and obtain a client packet based on the slice sequence number and slice reorganization.

In other words, the embodiment of the present disclosure reorganizes the slices based on the slice sequence number in the tag value, and finally obtains the client packet before segmentation.

A seventh embodiment of the present disclosure provides a computer-readable storage medium storing a computer program that, when executed by a processor, allows the processor to perform the steps of any one of the methods in the first embodiment of the present disclosure, the second embodiment of the present disclosure and the third embodiment of the present disclosure.

An eighth embodiment of the present disclosure provides a source node device. The source node device includes a memory, a processor, and a computer program stored in the memory and capable of running on the processor. The computer program, when executed by the processor, allows the processor to perform the steps of any one of the methods in the first embodiment of the present disclosure.

A ninth embodiment of the present disclosure provides an intermediate node device. The intermediate node device includes a memory, a processor, and a computer program stored on the memory and capable of running on the processor. The computer program, when executed by the processor, allows the processor to perform the steps of any one of the methods in the second embodiment of the present disclosure.

A tenth embodiment of the present disclosure provides a sink node device. The sink node device includes a memory, a processor, and a computer program stored on the memory and capable of running on the processor. The computer program, when executed by the processor, allows the processor to perform the steps of any one of the methods in the third embodiment of the present disclosure.

It should be noted that the content of the various embodiments of the present disclosure may be understood with reference to each other.

Although the exemplary embodiments of the present disclosure have been disclosed for illustrative purposes, those skilled in the art may realize that various improvements, additions, and substitutions are also possible. Therefore, the scope of the present disclosure should not be limited to the above-mentioned embodiments.

What is claimed is:

1. A client packet processing method, applicable for a source node device, comprising:
    slicing and encapsulating a client packet based on a preset slice length, and adding a tag value to each slice, wherein the tag value is used to identify characteristic information of the client packet in the slice, wherein slicing and encapsulating the client packet according to the preset slice length comprises:
    in response to information amount of the client packet being less than the preset slice length, encapsulating the client packet after filling positions that fall short of the preset slice length with idle information, wherein the idle information is information filled to make a slice length the same as the preset slice length; and
    in response to one slice comprising multiple client packets of the same client, encapsulating a length of the client packet in front of each client packet in the slice; and
    outputting encapsulated slices.

2. The method according to claim 1, wherein content of the tag value comprises at least one of a packet flow number and a slice sequence number.

3. The method according to claim 1, wherein the slice is provided with a preamble and a start frame delimiter.

4. The method according to claim 3, wherein the method further comprises:
    based on a time-sensitive network (TSN) protocol, setting front fields of a first slice of the client packet as a preamble field, a start first frame delimiter SMD-SX field and a tag value field; and
    front fields of subsequent slices of the client packet as the preamble field, a start second frame delimiter SMD-CX field, and the tag value field.

5. A computer-readable non-transitory storage medium, storing a computer program that, when executed by a processor, allows the processor to perform the steps of the method according to claim 1.

6. The method according to claim 1, wherein after slicing the client packet based on the preset slice length, and before outputting the encapsulated slices, the method further comprises:
   calculating a cyclic redundancy check (CRC) value of the slice, and encapsulating the CRC value in the slice.

7. The method according to claim 1, wherein outputting the encapsulated slices comprises:
   outputting the encapsulated slices at a preset sending rate based on a preset sending time.

8. The method according to claim 1, wherein the client packet comprises at least one of an Ethernet (MAC) packet and an encoding block of a physical coding sublayer (PCS) layer.

9. A source node device, configured to perform the steps of the method according to claim 1, wherein the source node device comprising:
   a memory;
   a processor; and
   a computer program stored on the memory and capable of running on the processor; wherein the computer program, when executed by the processor, allows the processor to perform the steps of the method according to claim 1.

10. A packet processing method, applicable for an intermediate node device, comprising:
   determining whether a slice received after encapsulated is subjected to a pass-through operation or a final operation, wherein the slice has a preset slice length; and
   in response to the pass-through operation is performed for the slice, scheduling and outputting the slice based on a tag value carried in the slice, wherein the intermediate node device does not reorganize the slice;
   the slice after encapsulated comprising idle information, wherein the idle information is information filled to make a slice length the same as the preset slice length the slice after encapsulated comprising multiple client packets of the same client, in front of each client packet in the slice after encapsulated is encapsulated a length of the client packet.

11. The method according to claim 10, wherein determining whether the slice received after encapsulated is subjected to the pass-through operation or the final operation comprises:
   parsing the tag value in the slice to obtain a packet flow number; and
   determining whether the slice is subjected to the pass-through operation or the final operation based on the packet flow number.

12. The method according to claim 11, wherein scheduling and outputting the slice based on the tag value carried in the slice comprises:
   scheduling and outputting the slice based on the packet flow number.

13. An intermediate node device, configured to perform the steps of the method according to claim 9, wherein the intermediate node device comprising
   a memory, a processor; and
   a computer program stored in the memory and capable of running on the processor; wherein the computer program, when executed by the processor, allows the processor to perform the steps of the method according to claim 10.

14. A packet processing method, applicable for a sink node device, comprising:
   determining whether a slice received after encapsulated is subjected to a pass-through operation or a final operation, wherein the slice has a preset slice length; and
   in response to the final operation is performed for the slice, reorganizing a slice packet based on a tag value carried by the slice, and restoring the client packet;
   the slice after encapsulated comprising idle information, wherein the idle information is information filled to make a slice length the same as the preset slice length the slice after encapsulated comprising multiple client packets of the same client, in front of each client packet in the slice after encapsulated is encapsulated a length of the client packet.

15. The method according to claim 14, wherein determining whether the slice received after encapsulated is subjected to the pass-through operation or the final operation comprises:
   parsing the tag value in the slice to obtain a packet flow number; and
   determining whether the slice is subjected to the pass-through operation or the final operation based on the packet flow number.

16. The method according to claim 14, wherein reorganizing the slice packet based on the tag value carried by the slice comprises:
   parsing the tag value in the slice to obtain a slice sequence number; and
   obtaining the client packet based on the slice sequence number and a slice reorganization.

17. A sink node device, configured to perform the steps of the method according to claim 14, wherein the sink node device comprising:
   a memory;
   a processor; and
   a computer program stored on the memory and capable of running on the processor;
   wherein the computer program, when executed by the processor, allows the processor to perform the steps of the method according to claim 14.

* * * * *